M. S. CLARK.
WAGON-BRAKE.
No. 181,642.  Patented Aug. 29, 1876.
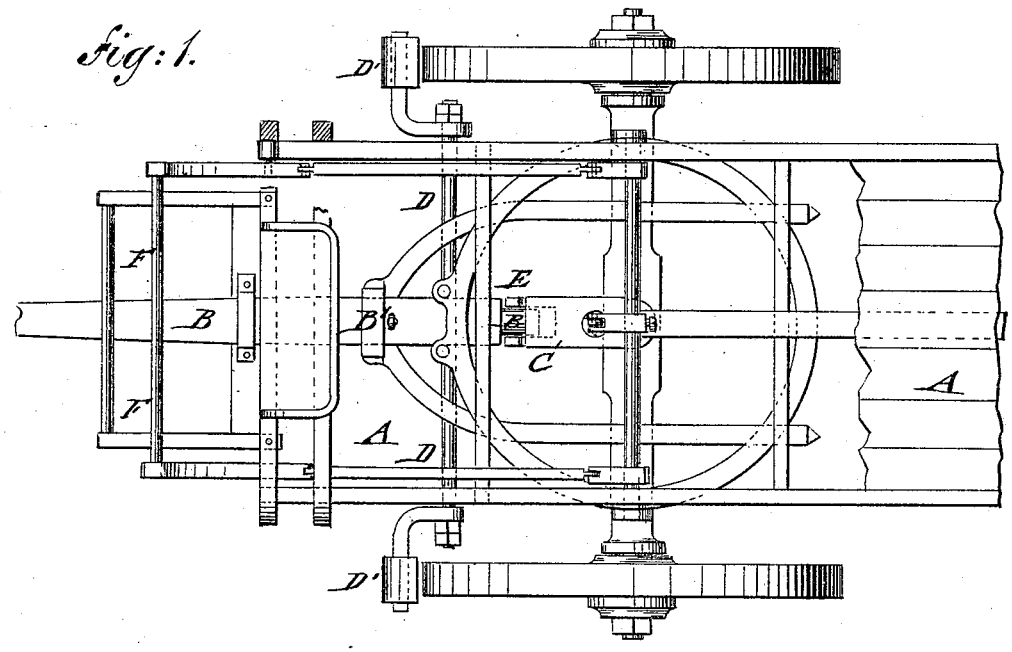
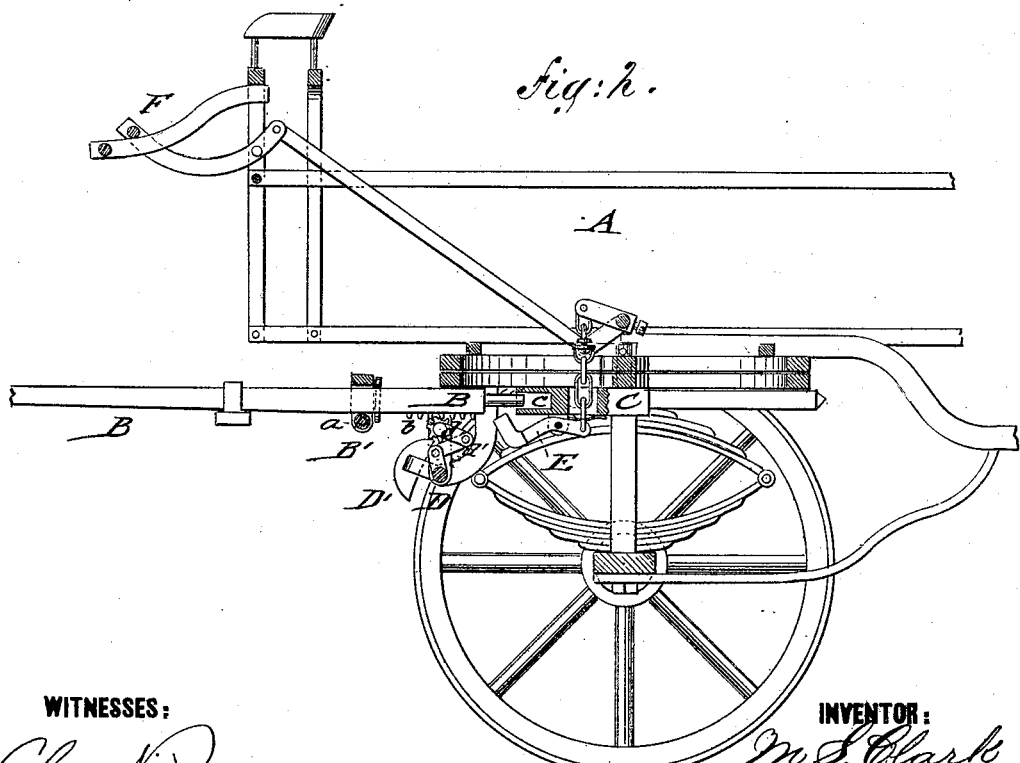

UNITED STATES PATENT OFFICE.

MINFORD S. CLARK, OF BROOKLYN, NEW YORK.

IMPROVEMENT IN WAGON-BRAKES.

Specification forming part of Letters Patent No. 181,642, dated August 29, 1876; application filed July 31, 1876.

*To all whom it may concern:*

Be it known that I, MINFORD S. CLARK, of Brooklyn, in the county of Kings and State of New York, have invented a new and Improved Wagon-Brake, of which the following is a specification.

In the accompanying drawing, Figure 1 represents a top view, and Fig. 2 a sectional side elevation, of my improved wagon-brake.

Similar letters of reference indicate corresponding parts.

The object of this invention is to provide an improved brake for wagons, trucks, carriages, and vehicles of all kinds, which is operated by the tongue on the backing of the horses, so as to utilize the strain exerted thereon in going down hill, and produce a powerful brake, that works automatically, without requiring a special effort of the driver.

The invention will first be described in connection with drawing, and then pointed out in the claims.

A forked and spring-acted lever is worked by swivel-chain, crank-lever connection, and treadle, from the driver's seat, to engage the tongue and prevent its backward motion when it is desired to back the vehicle.

In the drawing, A represents a truck, wagon, or other vehicle to which my improved brake-construction is applied.

The tongue or pole B is arranged to slide freely in guide-supports B' of the vehicle, the front support having a small friction-roller, $a$, to facilitate the motion of the tongue. The pin-shaped rear end of the tongue slides in a guide-socket, C, secured to the fifth-wheel. A rack-bar, $b$, at the under side of the tongue gears with a pinion, $d$, whose shaft turns in bearings of the side supports B' of the tongue, and operates, by crank-arms $d'$ at the ends, and pivoted connected links $e$, the fixed crank-arms of the brake-rod D that turns in suitable supports of the fifth-wheel. The brake-shoes D' are applied to the wheels by the backward motion of the tongue, which actuates the intermediate mechanism, and thereby the brake-rod. The forward motion of the tongue actuates the brake-rod mechanism in opposite direction, and carries the brakes upward, so as to clear the wheels.

As long as the horses are pulling, and exert a forward strain on the tongue, the brakes are not called into action; but as soon as the horses exert a backward strain thereon in going down hill, the brakes are instantly applied by the backward motion of the tongue.

For the purpose of enabling the driver to back the vehicle at any moment without producing the action of the brake by the backward motion of the tongue, a forked locking-lever, E, is arranged near the rear end of the tongue, and fulcrumed in such a manner to suitable supports that the front end may pass up along both sides of the rear part of the tongue, when the spring-acted rear end is lowered. The forked front end, being placed between the rear part of the tongue and the guide-socket C, prevents the backward sliding of the tongue, and thereby the actuating of the brakes, so as to admit the backing of the vehicle, unimpeded by the brakes.

The locking-lever E is operated by a treadle-rod, F, and suitable lever-connection from the driver's seat, the feet of the driver resting on the treadle-rod until released for the purpose of backing, so as to throw the spring of the locking-lever into action. The treadle F is fulcrumed to the seat-supporting part, and connected by lever-rods with fixed crank-arms of a lateral shaft that turns in bearings of the wagon-body. The shaft connects by a center crank and swivel-chain with the rear end of the locking-lever, the swivel-chain being guided in a perforation of the socket C, and adapted by the swivel to follow the motion of the fifth-wheel, so that the locking-lever may be freely operated without a straining or twisting of the chains, whatever be the position of the front wheels.

The operation of the locking-lever and brakes is thus accomplished without any exertion or effort of the driver; the lever being merely released when required, or held in depressed state by resting the feet on the treadle while the brake-action is produced by the automatic working of the tongue.

Having thus described my invention, I claim as new and desire to secure by Letters Patent—

1. The combination of sliding tongue B, having pin-shaped end, and the socket C of fifth-wheel, with rack and pinion $b\ d$, crank-arms $a'$, and brake-rod D, having fixed crank-arms, as described.

2. A wagon-brake, provided with a forked lever, E, between the rear of tongue and socket C, as set forth.

3. The lever E, connected with a rock-shaft by swivel-chain, as and for the purpose specified.

4. The guide-socket C, having slotted perforation to guide swivel-chain, substantially as described.

MINFORD S. CLARK

Witnesses:
 PAUL GOEPEL,
 ALEX. F. ROBEBTS.